United States Patent
Ogura (10) Patent No.: US 9,076,215 B2
(45) Date of Patent: Jul. 7, 2015

(54) ARITHMETIC PROCESSING DEVICE

(71) Applicant: Panasonic Corporation, Osaka (JP)

(72) Inventor: Motonori Ogura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 134 days.

(21) Appl. No.: 13/686,103

(22) Filed: Nov. 27, 2012

(65) Prior Publication Data

US 2013/0136340 A1 May 30, 2013

(30) Foreign Application Priority Data

Nov. 28, 2011 (JP) ................................ 2011-258972

(51) Int. Cl.
*G06K 9/00* (2006.01)
*G06T 7/00* (2006.01)

(52) U.S. Cl.
CPC ................ *G06T 7/0075* (2013.01); *G06K 9/00* (2013.01); *G06T 7/003* (2013.01); *G06T 2207/10012* (2013.01)

(58) Field of Classification Search
CPC ................... G06T 2207/10012; G06T 7/0022; G06T 15/20; G06T 2200/24; G06T 2207/20228; G06T 2200/21; H04N 2013/0081; H04N 13/0203; H04N 19/00781; H04N 19/00733; H04N 5/145; H04N 19/00218; H04N 19/00678; H04N 13/0409; G01C 11/06; A61B 8/5246; G06K 9/00228; G06K 2209/40; G09G 2370/02; G09G 2340/16
USPC .......... 382/106, 107, 154; 345/419, 420, 423, 345/506; 348/42, 116, 153
See application file for complete search history.

(56) References Cited

U.S. PATENT DOCUMENTS

| | | | | |
|---|---|---|---|---|
| 5,099,446 | A * | 3/1992 | Sako et al. | 708/495 |
| 5,739,822 | A * | 4/1998 | Paradine | 345/419 |
| 5,768,404 | A | 6/1998 | Morimura et al. | |
| 5,982,342 | A * | 11/1999 | Iwata et al. | 345/7 |
| 6,005,987 | A * | 12/1999 | Nakamura et al. | 382/294 |
| 6,215,899 | B1 | 4/2001 | Morimura et al. | |
| 6,366,691 | B1 * | 4/2002 | Sogawa | 382/154 |
| 7,602,966 | B2 * | 10/2009 | Liu et al. | 382/154 |
| 8,174,563 | B2 * | 5/2012 | Saito | 348/47 |
| 8,427,488 | B2 * | 4/2013 | Hirai et al. | 345/506 |
| 2004/0022320 | A1 * | 2/2004 | Kawada et al. | 375/240.16 |

(Continued)

FOREIGN PATENT DOCUMENTS

| | | |
|---|---|---|
| JP | 8-280026 | 10/1996 |
| JP | 2001-184497 | 7/2001 |

(Continued)

*Primary Examiner* — Vu Le
*Assistant Examiner* — Aklilu Woldermariam
(74) *Attorney, Agent, or Firm* — Panasonic Patent Center (57) ABSTRACT

An image processor sets a first predetermined number of first blocks at first intervals in a second image, calculates a first evaluated value, selects one of the first blocks, and calculates a first parallax between the selected first block and the matching target block. An image processor sets a second predetermined number of second blocks at second intervals in a second image, calculates a second evaluated value, selects one of the second blocks, and calculates a second parallax between the selected second block and the matching target block. A controller determines, based on the first evaluated value and the second evaluated value and based on the first parallax and the second parallax, whether or not to employ one of the first parallax and the second parallax.

5 Claims, 4 Drawing Sheets

(56) References Cited

U.S. PATENT DOCUMENTS

| | | | |
|---|---|---|---|
| 2007/0133682 A1* | 6/2007 | Arai et al. | 375/240.16 |
| 2008/0175439 A1* | 7/2008 | Kurata | 382/107 |
| 2009/0073277 A1* | 3/2009 | Numata et al. | 348/222.1 |
| 2011/0169820 A1 | 7/2011 | Saito | |
| 2012/0162223 A1* | 6/2012 | Hirai et al. | 345/419 |

FOREIGN PATENT DOCUMENTS

| | | |
|---|---|---|
| JP | 2007-172500 | 7/2007 |
| JP | 2011-120233 | 6/2011 |

* cited by examiner

|  | FIRST EVALUATED VALUE OF RELIABILITY < PREDETERMINED VALUE | FIRST EVALUATED VALUE OF RELIABILITY ≧ PREDETERMINED VALUE |
|---|---|---|
| SECOND EVALUATED VALUE OF RELIABILITY < PREDETERMINED VALUE | NOT EMPLOY EITHER FIRST VECTOR PROCESSING VALUE OR SECOND VECTOR PROCESSING VALUE | EMPLOY FIRST VECTOR PROCESSING VALUE |
| SECOND EVALUATED VALUE OF RELIABILITY ≧ PREDETERMINED VALUE | EMPLOY SECOND VECTOR PROCESSING VALUE | WHEN FIRST VECTOR PROCESSING VALUE = SECOND VECTOR PROCESSING VALUE, EMPLOY FIRST VECTOR PROCESSING VALUE, WHEN FIRST VECTOR PROCESSING VALUE ≠ SECOND VECTOR PROCESSING VALUE, NOT EMPLOY EITHER FIRST VECTOR PROCESSING VALUE OR SECOND VECTOR PROCESSING VALUE |

ARITHMETIC PROCESSING DEVICE

BACKGROUND

1. Technical Field

The present disclosure relates to an arithmetic processing device that processes a plurality of images captured from different viewpoints.

2. Related Art

JP-A-2011-120233 discloses a technique of calculating a parallax between an image represented by a video signal in a first viewpoint (hereinafter referred to as a "first viewpoint signal") and an image represented by a video signal in a second viewpoint (hereinafter referred to as a "second viewpoint signal").

When the images represented by the first viewpoint signal sometimes and the second viewpoint signal include a subject with repeating patterns, such as a fence or a lattice. In this case, the parallax is sometimes falsely detected.

The present disclosure provides an arithmetic processing device capable of determining a parallax appropriately even when a subject with repeating patterns is included in images.

SUMMARY

An arithmetic processing device includes:
  a processor that:
  (i) acquires a first viewpoint signal and a second viewpoint signal relating to images composed of a plurality of pixels;
  (ii) divides a first image represented by the acquired first viewpoint signal into a plurality of blocks each including a predetermined number of pixels;
  (iii) sets a first predetermined number of a first blocks at first intervals in a second image represented by the second viewpoint signal, calculates a first evaluated value indicating a degree of matching by matching a matching target block in the first image with each of the first blocks, selects one of the first blocks from the first predetermined number of the first blocks based on the first evaluated value, and calculates a first parallax between the selected first block and the matching target block;
  (iv) sets a second predetermined number of second blocks at second intervals in a second image represented by the second viewpoint signal, calculates a second evaluated value indicating a degree of matching by matching the matching target block with each of the second blocks, select one of the second blocks from the second predetermined number of the second blocks based on the second evaluated value, and calculates a second parallax between the selected second block and the matching target block; and
  (v) determines, based on the first evaluated value and the second evaluated value and based on the first parallax and the second parallax, whether or not to employ one of the first parallax and the second parallax as a parallax between the matching target block and a block in the second image corresponding to the matching target block.

An arithmetic processing device according to the present disclosure can determine a parallax appropriately even when a subject with repeating patterns is included in images.

DETAILED DESCRIPTION OF PREFERRED EMBODIMENT

Embodiments will now be described in detail appropriately with reference to the drawings. However, explanations detailed more than necessary will not be provided. For example, detailed explanations of matters that have been well-known or a repetitive explanation about a configuration that is substantially the same as the previously described one will not be provided. This is to avoid the following description being unnecessarily tedious, and to facilitate understanding by a person skilled in the art.

The inventor(s) provides the accompanying drawings and the following description only to allow a person skilled in the art to fully understand the present disclosure, and not intending to limit the subject matter of the invention defined in the appended claims.

First Embodiment

Hereinafter, a first embodiment will be described with reference to the drawings.

1-1. Configuration

Figure 1:
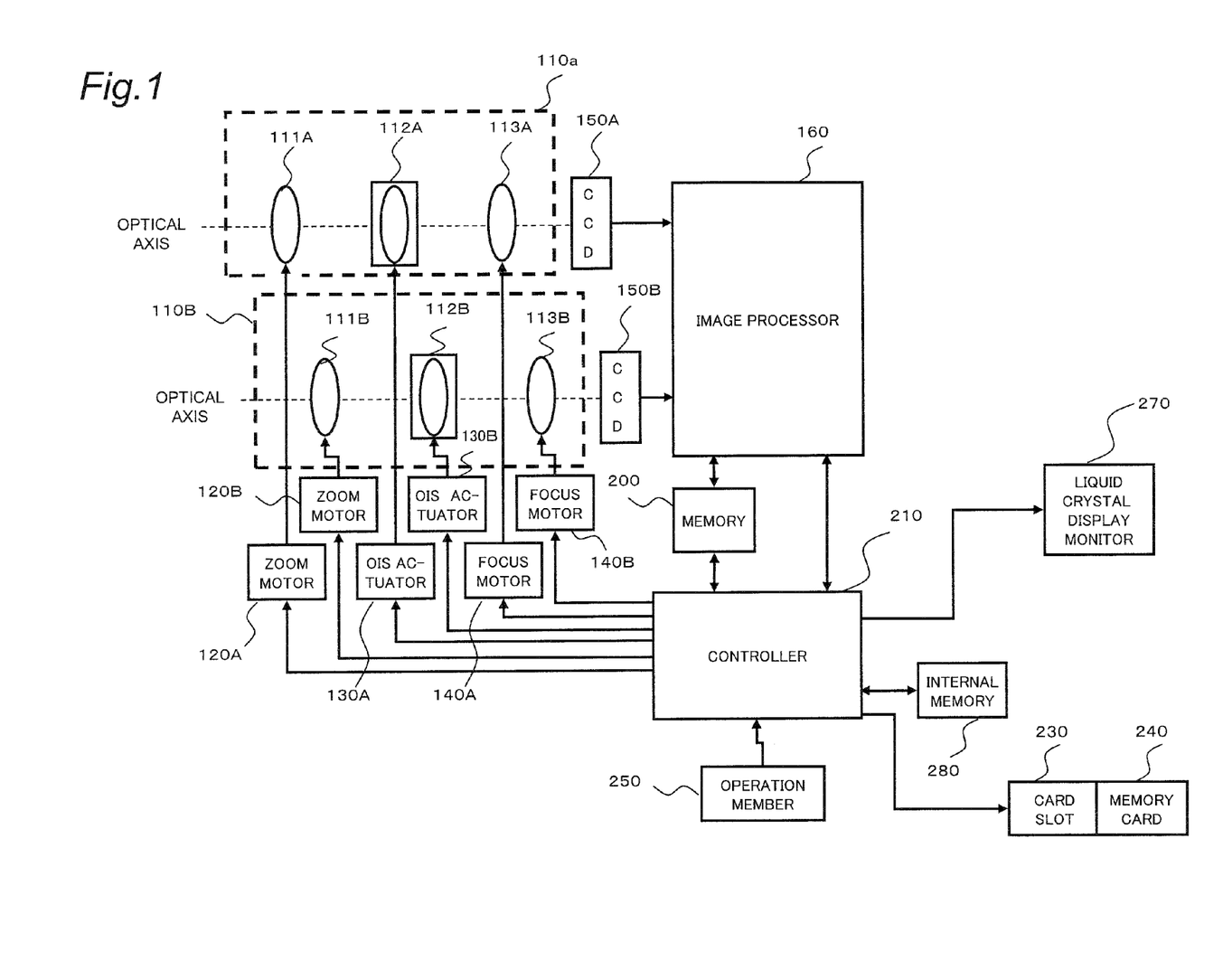
FIG. 1 is a block diagram illustrating an electrical configuration of a digital video camera 1 according to a first embodiment.

FIG. 1 is a block diagram illustrating an electrical configuration of a digital video camera 1 according to the first embodiment.

The digital video camera 1 is provided with optical systems 110a and 110b, zoom motors 120a and 120b, OIS actuators 130a and 130b, focus motors 140a and 140b, CCD image sensors 150a and 150b, an image processor 160, a memory 200, a controller 210, a card slot 230, a memory card 240, a operation member 250, a liquid crystal display monitor 270, and an internal memory 280.

The optical system 110a includes a zoom lens 111a, an OIS 112a, and a focus lens 113a. The optical system 110b includes a zoom lens 111b, an OIS 112b, and a focus lens 113b. The optical system 110a forms an image of a subject in a first viewpoint. The optical system 110b forms an image of the subject in a second viewpoint different from the first viewpoint.

The zoom lenses 111a and 111b are respectively able to enlarge or reduce the images of the subject formed by the CCD image sensors 150a and 150b by moving along optical axes of the respective optical systems. The zoom lenses 111a and 111b are controlled by the zoom motors 120a and 120b, respectively.

The OISs 112a and 112b each include a correcting lens therein, which is movable along a plane perpendicular to the optical axis. Each of the OISs 112a and 112b reduces blurring in the image of the subject by moving the correcting lens toward a direction for canceling the blurring of the digital video camera 1. Further, according to this embodiment, it is possible to adjust a point of convergence to be on a far side or a near side by shifting both of the correcting lens of the OIS 112a and the correcting lens of the OIS 112b to a center side or both end sides.

The focus lenses 113a and 113b respectively adjust focuses of the images of the subject formed by the CCD image sensors 150a and 150b by moving along the optical axes of the respective optical systems. The focus lenses 113a and 113b are controlled by the focus motors 140a and 140b, respectively.

Here, the optical systems 110a and 110b are sometimes collectively referred to simply as the optical systems 110. The same applies to the zoom lenses 111, the OISs 112, the focus lenses 113, the zoom motors 120, the OIS actuators 130, the focus motors 140, and the CCD image sensors 150.

The zoom motors 120a and 120b drive and control the zoom lenses 111a and 111b, respectively. The zoom motors 120a and 120b may be realized by pulse motors, DC motors, linear motors, servo motors, or the like. The zoom motors 120a and 120b may be configured to drive the zoom lenses 111a and 111b using a cam mechanism or a mechanism such as a ball screw. Further, the zoom lens 111a and the zoom lens 111b may be controlled in the same operation.

The OIS actuators 130a and 130b respectively drive the correcting lenses in the OISs 112a and 112b along the planes perpendicular to the optical axes. The OIS actuators 130a and 130b can be realized by planar coils, ultrasonic motors or the like.

The focus motors 140a and 140b drive the focus lenses 113a and 113b, respectively. The focus motors 140a and 140b may be realized by pulse motors, DC motors, linear motors, servo motors, or the like. The focus motors 140a and 140b may be configured to drive the focus lenses 113a and 113b using a cam mechanism or a mechanism such as a ball screw.

The CCD image sensors 150a and 150b capture the images of the subject formed by the optical systems 110a and 110b to generate a first viewpoint signal and a second viewpoint signal, respectively. Each of the CCD image sensors 150a and 150b performs various operations such as exposure, transfer, and an electronic shutter.

The image processor 160 performs various processes to the first viewpoint signal and the second viewpoint signal generated respectively by the CCD image sensors 150a and 150b. The image processor 160 processes the first viewpoint signal and the second viewpoint signal to generate image data (hereinafter referred to as a review image) to be displayed in the liquid crystal display monitor 270, or to generate image signals to be stored in the memory card 240. For example, the image processor 160 performs various image processing to the first viewpoint signal and the second viewpoint signal, such as gamma correction, white balance correction, or defective pixel correction. In addition, the image processor 160 can perform vector processing to calculate a parallax based on the first viewpoint signal and the second viewpoint signal.

Further, the image processor 160 performs clipping to the first viewpoint signal and the second viewpoint signal in 3D image processing. Displacement in the first viewpoint signal and the second viewpoint signal of 3D images in the vertical direction gives a feeling of strangeness to a viewer, but this can be reduced by correcting a clipping position in the vertical direction.

Moreover, the image processor 160 compresses the first viewpoint signal and the second viewpoint signal that have been thus processed based on a compression format complying with a predetermined standard for a file system. Two compressed image signals respectively obtained by compressing the first viewpoint signal and the second viewpoint signal are associated with each other, and recorded in the memory card 240. When the image signal to be compressed is an image signal related to a moving image, the image signal is compressed based on a moving image compression standard such as H.264/MPEG4-AVC, for example. Further, it is possible to record a MPO file and a JPEG image or a MPEG moving image at the same time.

The image processor 160 can be realized by a DSP or a microcomputer. Here, resolution (the number of pixels) of the review image may be set to be the same as resolution of a screen of the liquid crystal display monitor 270, or resolution of an image compressed and generated based on a compression format complying with the JPEG standard, for example.

The memory 200 functions as a working memory for the image processor 160 and the controller 210. The memory 200 temporarily stores the image signals processed by the image processor 160 or image signals inputted from the CCD image sensors 150 before being processed by the image processor 160, for example. Further, the memory 200 temporarily stores shooting conditions when taking an image for the optical systems 110a and 110b, and the CCD image sensors 150a and 150b. Examples of the shooting conditions include a subject distance, information on an angle of view, an ISO speed, a shutter speed, an exposure value, an f-number, a distance between lenses, a shooting time, and an OIS shift amount. The memory 200 can be realized by a DRAM, a ferroelectric memory, for example.

The internal memory 280 is configured by a flash memory, a ferroelectric memory, or the like. The internal memory 280 stores a control program for controlling the digital video camera 1 as a whole, or the like.

The controller 210 is control means for controlling an entire device. The controller 210 may be configured only from hardware, or may be realized by a combination of hardware and software. The controller 210 can be realized by a microcomputer or the like.

The memory card 240 can be attached to and detached from the card slot 230. The card slot 230 can be mechanically and electrically connected with the memory card 240.

The memory card 240 includes a flash memory, a ferroelectric memory, or the like therein, and can store data.

The operation member 250 is a user interface for receiving an operation from a user, and provided with, for example, a selection button and a start recording button for receiving operations from the user. The selection button receives selection among various menus, by receiving the operation from the user. The start recording button is a button for starting a recording of moving image by receiving a pressing operation by the user while the digital video camera 1 is ready and waiting for recording. Here, the start recording button also serves as a button for stopping the recording of the moving image by receiving the pressing operation by the user while the digital video camera 1 is recording the moving image.

The liquid crystal display monitor 270 is a display device capable of displaying the first viewpoint signal and the second viewpoint signal generated by the CCD image sensors 150a and 150b, or the first viewpoint signal and the second viewpoint signal read from the memory card 240 in 2D or in 3D. Further, the liquid crystal display monitor 270 can display various setting configurations of the digital video camera 1. For example, the liquid crystal display monitor 270 can display the exposure value, the f-number, the shutter speed, the ISO speed, and the like that are the shooting conditions when taking an image.

1-2. Operation

Next, an operation of the digital video camera 1 thus configured will be described.

When a power supply of the digital video camera 1 is turned ON, the controller 210 supplies power to components of the digital video camera 1. Once the power is supplied to the components of the digital video camera 1, the controller 210 resets (initializes) the lenses of the optical system 110a and the lenses of the optical system 110b, and causes the lenses to be ready to capture an image. The controller 210 sets the CCD image sensor 150a and the CCD image sensor 150b to be ready for taking an image. Once the components of the digital video camera 1 are set to be ready for taking an image, the liquid crystal display monitor 270 starts displaying an image (through image) that is being captured.

Upon starting of the display of the through image in the liquid crystal display monitor 270, the image processor 160 acquires the first viewpoint signal generated by the CCD image sensor 150a via the optical system 110a and the second viewpoint signal generated by the CCD image sensor 150b via the optical system 110b.

The image processor 160 divides an image represented by the acquired first viewpoint signal into a plurality of blocks, and calculates a video difference vector between each the blocks and the image represented by the first viewpoint signal. The image processor 160 divides the first viewpoint signal into blocks of 8 pixels×8 pixels, for example, and calculates the video difference vector for each of these blocks. The blocks of 8 pixels×8 pixels are a example, and the size of the blocks can be appropriately varied depending on processing capacities of the image processor 160 and the controller 210. The image processor 160 matches respectively the blocks in the image represented by the first viewpoint signal with a plurality of blocks set in the image represented by the second viewpoint signal as will be described later. With this, the image processor 160 can recognize a position of a block in the image represented by the second viewpoint signal that matches a block in the first viewpoint signal.

In particular, in this embodiment, the image processor 160 performs matching based on first parameters and matching based on second parameters. Each of the first parameters and the second parameters includes information such as the number of blocks for matching, a search range, search accuracy, and a weighting value when selecting a block by matching. A table shown below is a specific example of the parameters in this embodiment.

|  | First parameters | Second parameters |
|---|---|---|
| Number of blocks for matching | 9 | 9 |
| Search range | ±4 pixels | ±8 pixels |
| Search accuracy | 1 pixel | 2 pixels |
| Weighting value | Larger for block closer to reference position | Larger for block farther from reference position |

In this embodiment, the search range and the search accuracy for matching are indicated by pixel coordinates at a central position of a block to be searched in the image represented by the second viewpoint signal. For example, where pixel coordinates of a central position of a block in the image represented by the first viewpoint signal taken as a matching reference in an calculation for a video difference vector is (i, j), the number of the blocks, the search range, and the search accuracy when performing matching in the second viewpoint image are defined by coordinates (i, j+1), (i, j+2), (i, j+3), and so on of pixels at central positions of blocks to be searched in the image represented by the second viewpoint signal. When performing matching for more than one block, a plurality of coordinates are defined. It should be noted that the definition is not limited to the above example. In this example, the number of the blocks to which matching is performed in the image represented by the second viewpoint signal for a single block in the image represented by the first viewpoint signal is indicated by the number of the pixel coordinates. Further, the example of the pixel coordinates listed above indicates that the blocks are displaced pixel by pixel in a horizontal direction from the reference position, and the number of the displaced pixels indicates the search accuracy (search interval) for matching. The search range for matching is determined based on the number of the blocks to which matching is performed in the image represented by the second viewpoint signal, and the search accuracy.

In the matching based on the first parameters, and in the matching based on the second parameters, the number of the blocks for matching in the calculation of the video difference vector are the same, but the search range and the search accuracy are different. The first parameters attach importance to the matching of a block closer to a block taken as a matching reference. In other words, in the first parameters, the closer a block is to the block taken as the matching reference, the larger the weighting value becomes. On the other hand, the second parameters attach importance to the matching of the block farther from the block taken as the matching reference. In other words, in the second parameters, the farther a block is from the block taken as the matching reference, the larger the weighting value becomes.

Figure 2:
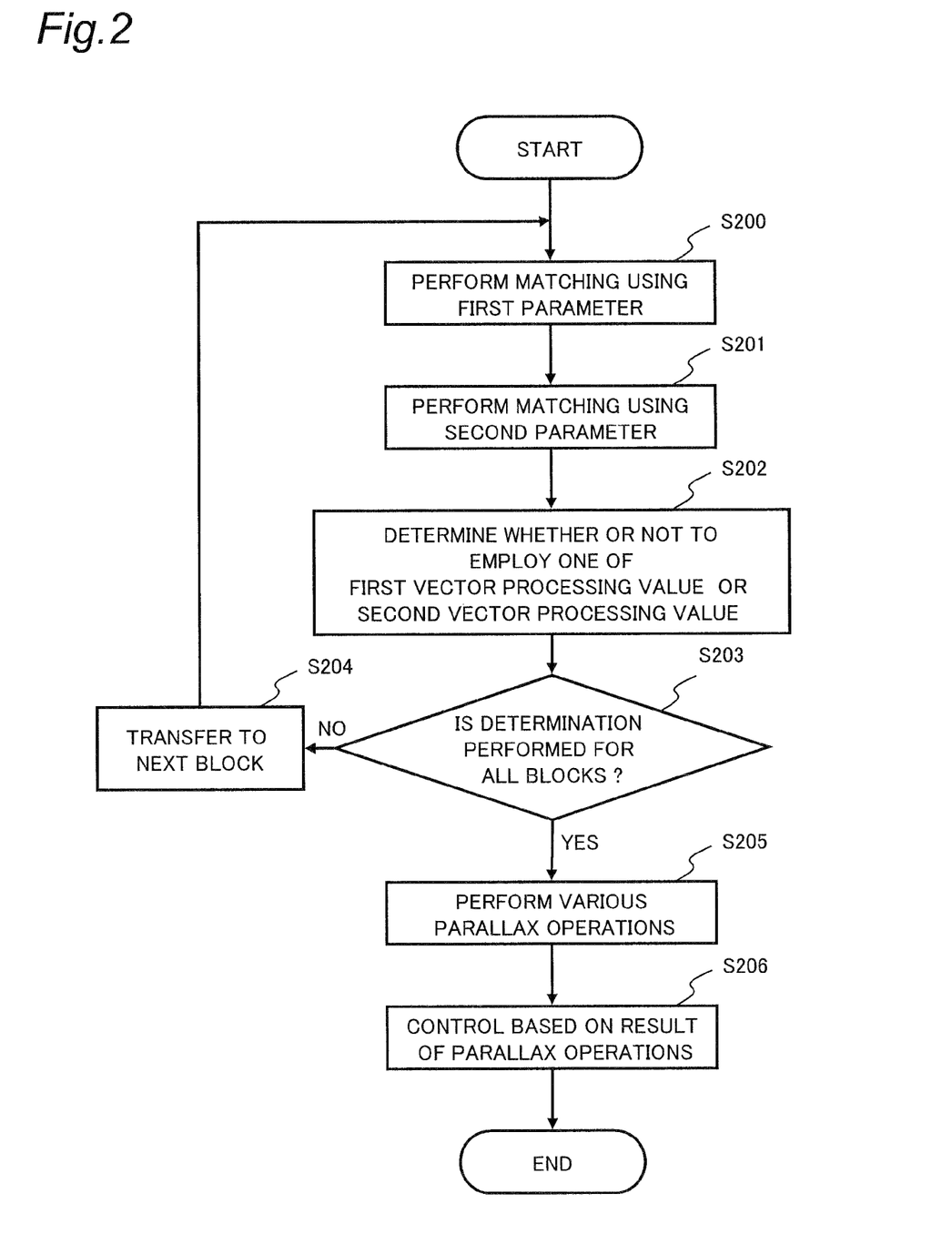
FIG. 2 is a flowchart of an operation for detecting a parallax according to the first embodiment.
Figure 3A:
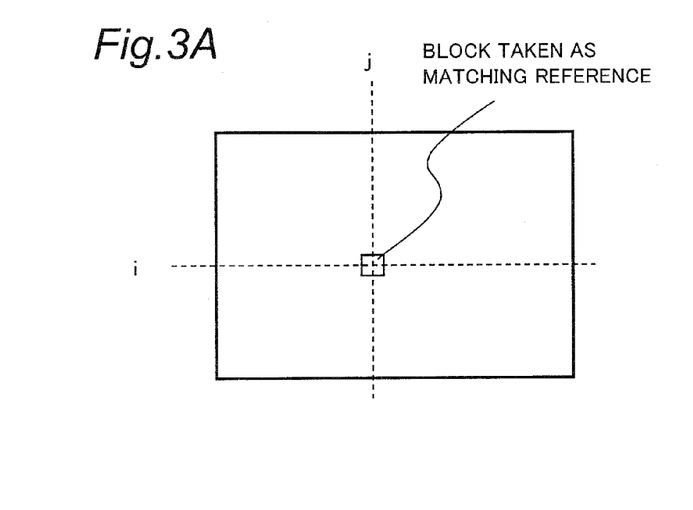
FIGS. 3A to 3C are diagrams for illustrating parameters for detecting the parallax according to the first embodiment.
Figure 3B:
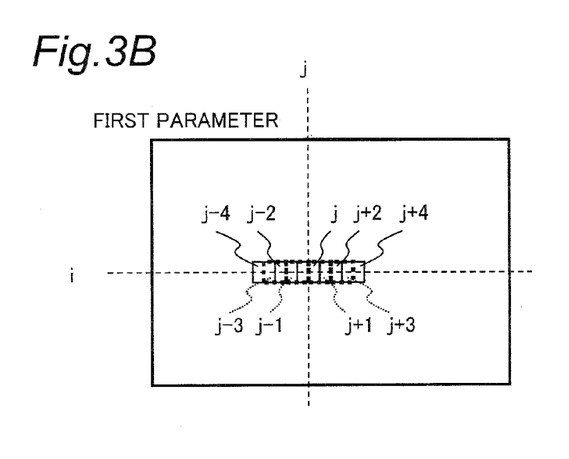
Figure 3C:
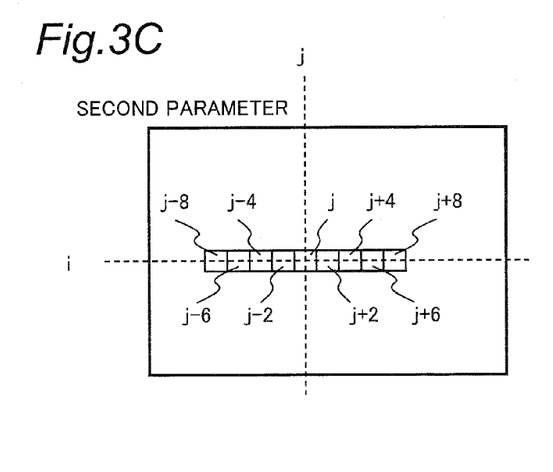

FIG. 2 is a flowchart of an operation for detecting the parallax according to the first embodiment. First, the image processor 160 performs matching for the calculation of the video difference vector using the first parameters (S200). The first parameters are stored in the internal memory 280, read by the controller 210 as needed, and outputted to the image processor 160. The search range and the search accuracy when using the first parameters are described with reference to FIGS. 3A to 3C. FIGS. 3A to 3C are diagrams for illustrating the parameters for detecting the parallax. Specifically, FIG. 3A is a diagram illustrating a block taken as the matching reference. FIG. 3B illustrates the search range and the search accuracy in the first parameters. FIG. 3C illustrates the search range and the search accuracy in the second parameters. Here, FIG. 2 shows a case in which a size of the block to be searched is 2 pixels×2 pixels.

As illustrated in FIG. 3A, it is assumed that pixel coordinates of a central position of the block taken as the matching reference in the calculation of the video difference vector in the first viewpoint image is (i, j). At this time, for the first parameters, pixel coordinates of central positions of blocks to be searched in the second viewpoint image are, as illustrated in FIG. 3B, (i, j−4), (i, j−3), (i, j−2), (i, j−1), (i, j), (i, j+1), (i, j+2), (i, j+3), and (i, j+4). Further, as described above, the first parameters attach importance to the matching of a block closer to the block taken as the matching reference. Therefore, in the first parameters, the weighting value for an operation result of the matching are set so as to become larger as the block is closer to the reference position (i, j).

The image processor 160 calculates a difference between the block taken as the matching reference in the first viewpoint signal (the block whose pixel coordinates at the central position is (i, j)) and each of the blocks to be searched in the second viewpoint signal (each of the blocks whose pixel coordinates at the central positions are (i, j−4), (i, j−3), (i, j−2), (i, j−1), (i, j), (i, j+1), (i, j+2), (i, j+3), and (i, j+4), respectively) (hereinafter referred to as "video difference" as appropriate). The image processor 160 evaluates each of the video differences, and outputs evaluated values relating to the degree of matching (hereinafter referred to as an "evaluated value of reliability" as needed). The video difference represents, for example, a sum of differences between brightness of pixels constituting the block taken as the matching reference in the first viewpoint image and brightness of pixels constituting each block to be searched in the second viewpoint image. Here, a large video difference indicates that a degree of matching is low (low reliability in matching; hereinafter simply referred to as "low reliability"), and a small video difference indicates that the degree of matching is high (high reliability in matching; hereinafter simply referred to as "high reliability"). Therefore, the image processor 160 evaluates the operation result to have higher reliability as the video difference is smaller. For example, the image processor 160 evaluates that the evaluated value of reliability is 100 if the video difference is 0. Then, the image processor 160 evaluates such that the evaluated value of reliability becomes closer to 0 as the video difference increases. The image processor 160 outputs evaluated values of reliability for each block to be searched in the second viewpoint image (each of the blocks whose pixel coordinates at the central positions are (i, j−4), (i, j−3), (i, j−2), (i, j−1), (i, j), (i, j+1), (i, j+2), (i, j+3), and (i, j+4)). Then, the image processor 160 performs weighting to the evaluated value of reliability outputted for each block, as set for the corresponding block.

For example, the evaluated values of reliability obtained for the blocks to be searched in the second viewpoint image are assumed to be 0, 50, 100, 50, 0, 0, 0, 0, and 0 respectively at the blocks whose pixel coordinates at the central positions are (i, j−4), (i, j−3), (i, j−2), (i, j−1), (i, j), (i, j+1), (i, j+2), (i, j+3), and (i, j+4). Further, the weighting values are assumed to be 0.2, 0.4, 0.6, 0.8, 1, 0.8, 0.6, 0.4, and 0.2 respectively at the blocks whose pixel coordinates at the central positions are (i, j−4), (i, j−3), (i, j−2), (i, j−1), (i, j), (i, j+1), (i, j+2), (i, j+3), and (i, j+4). At this time, results of multiplication of the evaluated values of reliability respectively by the weighting values are 0, 20, 60, 40, 0, 0, 0, 0, and 0 respectively at the blocks whose pixel coordinates at the central positions are (i, j−4), (i, j−3), (i, j−2), (i, j−1), (i, j), (i, j+1), (i, j+2), (i, j+3), and (i, j+4). Accordingly, at this time, the image processor 160 recognizes pixel coordinates of the central position with a highest evaluated value after the weighting as a block that matches the block at (i, j−2) (matching position), and outputs a distance "−2" from the reference coordinates (the pixel coordinates (i, j) of the central position of the block as a reference) as the vector processing value. Here, the vector processing value and the evaluated value of reliability based on the first parameters are respectively referred to as a first vector processing value and a first evaluated value of reliability. At this time, the first vector processing value is −2, and the first evaluated value of reliability is 60. The first vector processing value is a first parallax calculated based on the first parameters.

Then, the image processor 160 performs matching for the calculation of the video difference vector using the second parameters (S201). The second parameters are stored in the internal memory 280, read by the controller 210 as needed, and outputted to the image processor 160. The search range and the search accuracy when using the second parameters are described with reference to FIG. 3C. FIG. 3C illustrates the search range and the search accuracy in the second parameters.

As illustrated in FIG. 3A, it is assumed that pixel coordinates of the central position of the block taken as the matching reference in the calculation of the video difference vector in the first viewpoint image is (i, j). At this time, for the second parameters, pixel coordinates of central positions of blocks to be searched in the second viewpoint image are, as illustrated in FIG. 3C, (i, j−8), (i, j−6), (i, j−4), (i, j−2), (i, j), (i, j+2), (i, j+4), (i, j+6), and (i, j+8). Further, the second parameters attach importance to the matching of a block farther from the block taken as the matching reference. Therefore, in the second parameters, the weighting value for the operation result for the matching are set so as to become larger as the block is farther from the reference position (i, j).

The image processor 160 calculates a video difference between the block taken as the matching reference in the first viewpoint signal (the block whose pixel coordinates at the central position is (i, j)) and each of the blocks to be searched in the second viewpoint signal (each of the blocks whose pixel coordinates at the central positions are (i, j−8), (i, j−6), (i, j−4), (i, j−2), (i, j), (i, j+2), (i, j+4), (i, j+6), and (i, j+8) respectively). The image processor 160 outputs, similarly to the case of the first parameters, evaluated values of reliability for each block to be searched in the second viewpoint image (each of the blocks whose pixel coordinates at the central positions are (i, j−8), (i, j−6), (i, j−4), (i, j−2), (i, j), (i, j+2), (i, j−4), (i, j+6), and (i, j+8)). Then, the image processor 160 multiplies the evaluated value outputted for each block by the weighting value set for the corresponding block.

For example, the evaluated values of reliability obtained for the blocks to be searched in the second viewpoint image are assumed to be 0, 0, 0, 100, 0, 0, 0, 0, and 80 respectively at the blocks whose pixel coordinates at the central positions are (1, j−8), (i, j−6), (i, j−4), (i, j−2), (i, j), (i, j+2), (i, j+4), (i, j+6), and (i, j+8). Further, the weighting values are assumed to be 1, 0.8, 0.6, 0.4, 0.2, 0.4, 0.6, 0.8, and 1 respectively at the blocks whose pixel coordinates at the central positions are (i, j−8), (i, j−6), (i, j−4), (i, j−2), (i, j), (i, j+2), (i, j+4), (i, j+6), and (i, j+8). At this time, results of multiplication of the evaluated values of reliability respectively by the weighting values are 0, 0, 0, 40, 0, 0, 0, 0, and 80 respectively at the blocks whose pixel coordinates at the central positions are (i, j−8), (i, j−6), (i, j−4), (i, j−2), (i, j), (i, j+2), (i, j+4), (i, j+6), and (i, j+8). Accordingly, at this time, the image processor 160 recognizes pixel coordinates of the central position with a highest evaluated value after the weighting as a block that matches the block at (i, j+8) (matching position), and outputs a distance "8" from the reference coordinates (the pixel coordinates (i, j) of the central position of the block as a reference) as the vector processing value. Here, the vector processing value and the evaluated value of reliability based on the second parameters are respectively referred to as a second vector processing value and a second evaluated value of reliability. At this time, the second vector processing value is +8, and the second evaluated value of reliability is 80. The second vector processing value is a second parallax calculated based on the second parameters.

The image processor 160 outputs the first vector processing value and the first evaluated value of reliability based on the first parameters and the second vector processing value and the second evaluated value of reliability based on the second parameters as the operation results to the controller 210.

Figure 4:
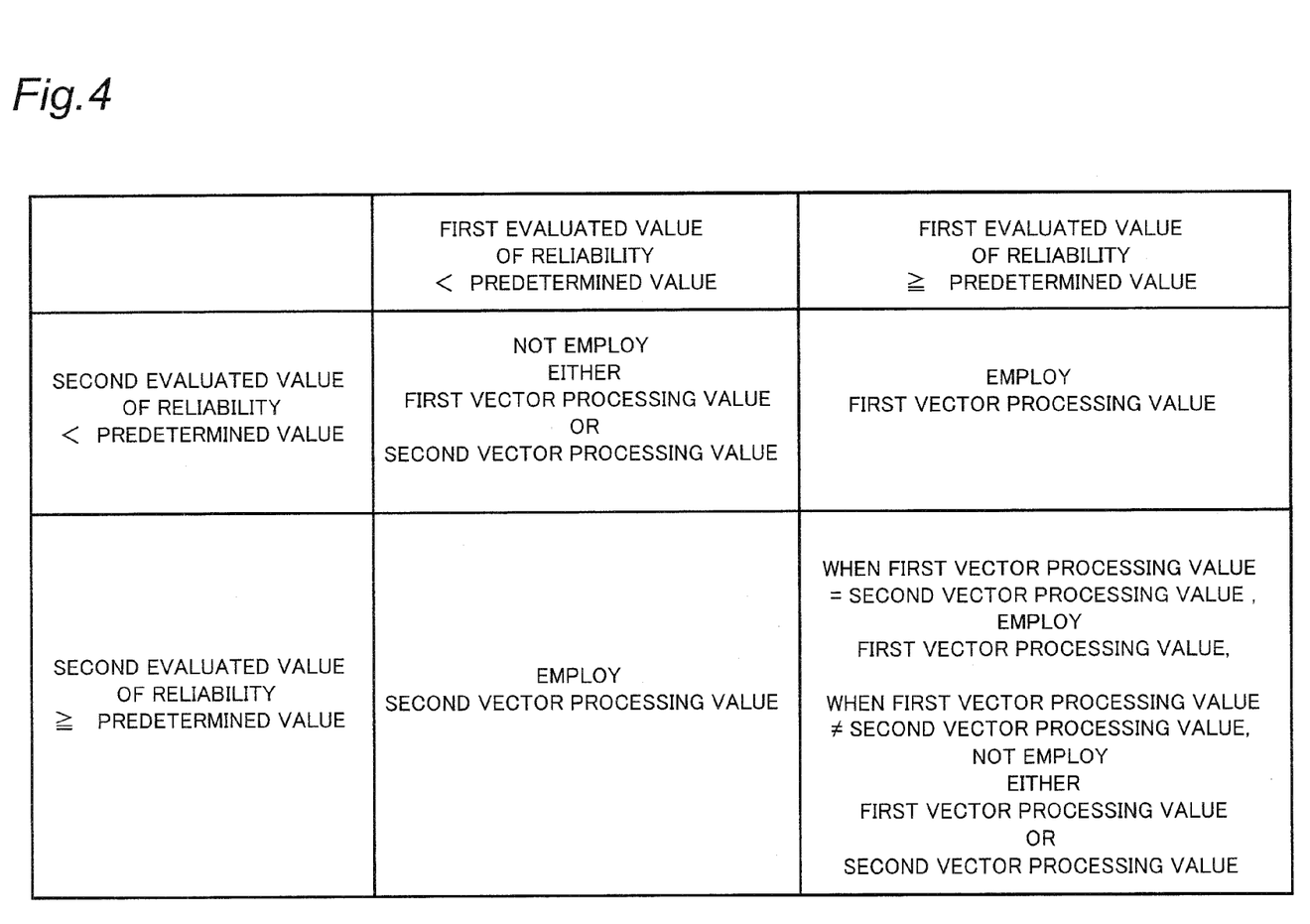
FIG. 4 is a table for illustrating determination on employment/non-employment of the parallax (vector processing value) according to the first embodiment.

Then, the controller 210 determines whether or not to employ the vector processing value for the block that is currently taken as the matching reference, based on the operation results outputted from the image processor 160 (S202). FIG. 4 is a table for illustrating determination on employment/non-employment of the calculated vector processing value according to the first embodiment.

As illustrated in FIG. 4, the controller 210 determines the employment/non-employment of the parallax based on whether the first evaluated value of reliability is lower than, or higher than or equal to a predetermined reference value and whether the second evaluated value of reliability is lower than, or higher than or equal to a predetermined reference value.

When the first evaluated value of reliability is lower than the predetermined reference value, and the second evaluated value of reliability is lower than the predetermined reference value, the controller 210 determines not to employ either the first vector processing value or the second vector processing value as the vector processing value for the block that is currently taken as the matching reference. This is because both of the first vector processing value based on the first parameters and the second vector processing value based on the second parameters are low in reliability, and may cause false detection of the parallax.

When the first evaluated value of reliability is higher than or equal to the predetermined reference value, and the second evaluated value of reliability is lower than the predetermined reference value, the controller 210 determines to employ the first vector processing value as the vector processing value of the block that is currently taken as the matching reference. This is because the second vector processing value based on the second parameters is low in reliability, but the first vector processing value based on the first parameters is high in reliability. Employing the first vector processing value in this manner can reduce the false detection of the parallax.

When the first evaluated value of reliability is lower than the predetermined reference value, and the second evaluated value of reliability is higher than or equal to the predetermined reference value, the controller 210 determines to employ the second vector processing value as the vector processing value of the block that is currently taken as the reference for matching. This is because the first vector processing value based on the first parameters is low in reliability, but the second vector processing value based on the second parameters is high in reliability. Employing the second vector processing value in this manner can reduce the false detection of the parallax.

When the first evaluated value of reliability is higher than or equal to the predetermined reference value, and the second evaluated value of reliability is higher than or equal to the predetermined reference value, the controller 210 compares the first vector processing value with the second vector processing value, and determines the employment/non-employment of the vector processing value for the block that is currently taken as the matching reference, based on the comparison result. Specifically, if the first vector processing value and the second vector processing value outputted from the image processor 160 are the same, the controller 210 determines to employ the first vector processing value as the vector processing value of the block that is currently taken as the matching reference. On the other hand, if the first vector processing value and the second vector processing value outputted from the image processor 160 are different, the controller 210 determines not to employ either the first vector processing value or the second vector processing value as the vector processing value for the block that is currently taken as the matching reference.

Now, the technical significance that the controller 210 does not employing the vector processing value for the block that is currently taken as the matching reference when the first vector processing value and the second vector processing value outputted from the image processor 160 are different is described. When the images represented by the first viewpoint signal and the second viewpoint signal include a subject with repeating patterns, such as a fence or a lattice, and the block in the first viewpoint signal that is currently taken as the matching reference includes the fence (or the lattice and such), the controller 210 sometimes falsely detects a position of a block for which matching is to be performed in the second viewpoint signal. For example, in a case in which a fence formed by a plurality of vertically extending bars that are parallel with each other is included, there is a case in which two adjacent vertical bars are falsely detected as a single identical vertical bar. In the matching according to this embodiment, the matching using the first parameters with a smaller search range and a higher search accuracy, and the matching using the second parameters with a larger search range and a lower search accuracy are performed to the block taken as the matching reference. If no repeating pattern that may cause false detection is included in the images represented by the first viewpoint signal and the second viewpoint signal, the same operation result is obtained both from the matching using the first parameters and the matching using second parameters. On the other hand, if repeating patterns that may cause false detection are included in the images represented by the first viewpoint signal and the second viewpoint signal, the operation result obtained from the matching using the first parameters is most likely different from the operation result obtained from the matching using the second parameters. Thus, the digital video camera 1 according to this embodiment compares the operation result based on the first parameters with the operation result based on the second parameters when performing the matching of the blocks, and determines whether or not repeating patterns that may cause false detection are included based on the comparison result. With this, even when repeating patterns that may cause false detection are included in the images represented by the first viewpoint signal and the second viewpoint signal, the controller 210 can exclude the vector processing value of a block of such repeating patterns based on the comparison result.

Referring back to FIG. 2, upon determination on the employment/non-employment of the vector processing value, as the operation result, for the block that is currently taken as the reference for matching (S202), the controller 210 determines whether or not there is a block to be next determined (S203). Specifically, the controller 210 determines whether or not the determination on the employment/non-employment has been completed for all of the blocks. When there is a block to be next determined, the controller 210 takes this block as the matching reference, and performs determination for this block (S204). Until the determination on the employment/non-employment is completed for all of the blocks in Step S203, the controller 210 repeats steps from Step S200 to Step S204.

When it is determined that the determination on the employment/non-employment of the vector processing value has been completed for all of the blocks (Yes in S203), the controller 210 performs various parallax operations based on the vector processing value employed for each block (S205). Here, for the block for which the vector processing value has not been employed, various parallax operations are performed using the vector processing value calculated for a different block.

The controller 210 calculates, for all the blocks taken as matching targets, a maximum vector processing value, a minimum vector processing value, a median value of the vector processing values, and an average value of the vector processing values, for example, as the various parallax operations.

Then, the controller 210 performs various controls based on the results of the parallax operations obtained by the calculation in Step S205 (S206). As various controls, the controller 210 determines whether or not the parallax of the image currently taken is suitable for viewing based on the maximum vector processing value and the minimum vector processing value, for example, and can notify the user of this by displaying the determination result in the liquid crystal display monitor 270. Alternatively, the controller 210 uses the average value of the vector processing values to control the OIS actuators 130*a* and 130*b*, and can adjust the convergence position to make the video more comfortable to watch.

1-3. Effects and the Like

As described above, according to this embodiment, the digital video camera 1 includes:

the image processor 160 that:
- (i) acquires a first viewpoint signal and a second viewpoint signal relating to images composed of a plurality of pixels;
- (ii) divides a first image represented by the acquired first viewpoint signal into a plurality of blocks each including a predetermined number of pixels;
- (iii) sets a first predetermined number of first blocks at first intervals in a second image represented by the second viewpoint signal, calculates a first evaluated value indicating a degree of matching by matching a matching target block in the first image with each of the first blocks, selects one of the first blocks of the first predetermined number based on the first evaluated value, and calculates a first parallax between the selected first block and the matching target block;
- (iv) sets a second predetermined number of second blocks at second intervals in a second image represented by the second viewpoint signal, calculate a second evaluated value indicating a degree of matching by matching the matching target block with each of the second blocks, select one of the second blocks of the second predetermined number based on the second evaluated value, and calculate a second parallax between the selected second block and the matching target block; and
- (v) determines, based on the first evaluated value and the second evaluated value and based on the first parallax and the second parallax, whether or not to employ one of the first parallax or the second parallax as a parallax between the matching target block and a block in the second image corresponding to the matching target block.

In this manner, the digital video camera 1 according to the present disclosure performs matching using two methods (based on the first parameters and the second parameters) to calculate the first evaluated value and the second evaluated value indicating degrees of matching as well as to calculate the first parallax and the second parallax. Then, based on these values, the digital video camera 1 determines whether or not to employ one of the first parallax the second parallax as the parallax between the matching target block in the first image and the block in the second image corresponding to the matching target block. With this, it is possible to employ a parallax whose degree of matching is high, that is, a parallax with high reliability, based on the first evaluated value and the second evaluated value. Here, when the image represented by the first viewpoint signal and the image represented by the second viewpoint signal do not include repeating patterns that may cause false detection, the first parallax and the second parallax becomes the same even if the matching is performed using two methods. By contrast, when the image represented by the first viewpoint signal and the image represented by the second viewpoint signal include repeating patterns that may cause false detection, it is highly probably that the first parallax and the second parallax are different. In this embodiment, whether or not to employ one of the first parallax and the second parallax is determined taking such a factor into account. With this, even when the images represented by first viewpoint signal and the second viewpoint signal include a subject with repeating patterns, such as a fence or a lattice, it is possible to appropriately determine the parallax. Further, it is possible to perform various controls more appropriately based on the results of the parallax operations.

Further, according to this embodiment, the controller 210:
- (i) employs neither of the first parallax and the second parallax as the parallax between the matching target block and the block in the second image corresponding to the matching target block when both of the first evaluated value and the second evaluated value are smaller than a reference value,
- (ii) employs the first parallax as the parallax between the matching target block and the block in the second image corresponding to the matching target block when the first evaluated value is greater than or equal to the reference value and the second evaluated value is smaller than the reference value,
- (iii) employs the second parallax as the parallax between the matching target block and the block in the second image corresponding to the matching target block when the first evaluated value is smaller than the reference value and the second evaluated value is greater than or equal to the reference value, and
- (iv) determines whether or not to employ one of the first parallax and the second parallax as the parallax between the matching target block and the block in the second image corresponding to the matching target block, based on magnitudes of the first parallax and the second parallax when both of the first evaluated value and the second evaluated value are greater than or equal to the reference value.

With this, one of the first parallax and the second parallax whose degree of matching is greater than a certain degree as well as greater than the other parallax is employed. Accordingly, accuracy in the parallax detection is improved. Here, if both of the first evaluated value and the second evaluated value are greater than or equal to the reference value, it is probable that a fence and the like are included. In this case, it is determined whether or not to employ one of the first parallax and the second parallax based on magnitudes of the first parallax and the second parallax. With this, it is possible to reduce false detection of the parallax due to a fence and the like.

Moreover, according to this embodiment, the controller 210, in a case in which both of the first evaluated value and the second evaluated value are greater than or equal to the reference value,
- (i) employs one of the first parallax and the second parallax as the parallax between the matching target block and the block in the second image corresponding to the matching target block when the magnitudes of the first parallax and the second parallax are equal, and
- (ii) employs neither of the first parallax and the second parallax as the parallax between the matching target block and the block in the second image corresponding to the matching target block when the magnitudes of the first parallax and the second parallax are different.

With this, the parallax can be set according to the cases determined based on the magnitudes of the first parallax and the second parallax. Accordingly, it is possible to set the parallax more appropriately. Therefore, it is possible to further reduce false detection of the parallax due to a fence and the like. Here, when the magnitudes of the first parallax and the second parallax are different even though the magnitudes of the first parallax and the second parallax are the same, it is highly probable that a fence and the like are included. In this case, it is possible to reduce false detection of the parallax due to a fence and the like by not employing either of the first parallax and the second parallax.

Furthermore, according to this embodiment,
the image processor 160:
(i) multiplies each of the first evaluated values obtained by the calculation by a first weighting value which is different for each first evaluation value, and selects one of the first blocks as a matching candidate based on a result of the multiplication,
(ii) multiplies each of the second evaluated values obtained by the calculation by a second weighting value which is different for each second evaluated value, and selects one of the second blocks as the matching candidate based on a result of the multiplication,
wherein the first weighting values of the first blocks take a greater value as a position of the first block corresponding to the first weighting value is closer to a central position of a first range being defined by the first predetermined number and the first interval, and
the second weighting values of the second blocks take a smaller value as a position of the second block corresponding to the second weighting value is closer to a central position of a second range being defined by the second predetermined number and the second interval.

With this, it is possible to select the second block as a matching candidate based on two types of parameters: selecting the second block as a matching candidate by the image processor 160 (the first arithmetic operation unit), and selecting the second block as a matching candidate by the image processor 160 (the second arithmetic operation unit). In the case in which the image processor 160 (the both arithmetic operation units) performs the weighting in a similar manner, there is a possibility that similar false detection may occur in the image processor 160 (these arithmetic operation units). However, by performing the weighting in different manners in the image processor 160 (between the first arithmetic operation unit and the second arithmetic operation unit), it is possible to reduce false detection that may similarly occur in these arithmetic operation units.

Further, according to this embodiment,
a first range containing the first blocks of the first predetermined number is different from a second range containing the second blocks of the second predetermined number, the first range being defined by the first predetermined number and the first interval, the second range being defined by the second predetermined number and the second interval.

With this, it is possible to perform the matching using two methods within the different ranges. Therefore, it is possible to reduce false detection occurring in a similar manner.

Moreover, according to this embodiment,
the first predetermined number is equal to the second predetermined number, and
the second interval is greater than the first interval.

With this, the first arithmetic operation unit can detect the parallax more finely, and the second arithmetic operation unit can detect the parallax in a range wider than a range in which the first arithmetic operation unit detects the parallax. Specifically, it is possible to detect the parallax finely and in a wide range with a limited number of blocks.

Other Embodiments

The first embodiment has been described above by an example of the technique disclosed by the present application. However, the technique according to the present disclosure is not limited to the above embodiment, and can be applied to embodiments that are appropriately configured by modification, replacement, addition, and omission. Further, it is possible to provide another embodiment by combining components described in the first embodiment.

Thus, other embodiments will now be described by an example.

While the above embodiment describes the case in which the number of the blocks for matching in the calculation of the video difference vector based on the first parameters and the number of the blocks for matching in the calculation of the video difference vector based on the second parameters are the same, the number of the blocks is not limited to such a configuration. In essence, as long as the calculation of the video difference vector is performed for a single block taken as a reference based on a plurality of parameters of different search ranges, such a configuration is within the scope of the present disclosure.

In the above embodiment, when the first evaluated value of reliability is higher than or equal to the predetermined reference value and the second evaluated value of reliability is higher than or equal to the predetermined reference value in the determination on the employment/non-employment in Step S202, the controller 210 employs the first vector processing value if the first vector processing value and the second vector processing value are the same. However, the present disclosure is not limited to such an example. When the first vector processing value and the second vector processing value are the same, the controller 210 may employ the second vector processing value. Further, the determination that the first vector processing value and the second vector processing value are the same is not necessarily made strictly by the controller 210. The controller 210 may determine that the first vector processing value and the second vector processing value are the same if a difference therebetween is within a predetermined range (about a few pixels).

In the above embodiment, the technique for preventing false detection when detecting the vector value by performing matching of the blocks along the horizontal direction but repeating patters in the horizontal direction are included is described. However, the technical idea of the present disclosure can be applied in order to prevent false detection when detecting a vector value by performing matching of the blocks along the vertical direction but repeating patters in a vertical direction are included. Further, the technical idea of the present disclosure can also be applied in order to prevent false detection when detecting a vector value by performing matching of the blocks along another direction but repeating patters in this direction are included.

The embodiments have been described above by an example of the technique according to the present disclosure. The accompanying drawings and the detailed description are thus provided.

Therefore, the components illustrated in the accompanying drawings and described in the detailed description include the components that are essential for solving the problem, as well as the components that are not essential and described only for illustration of the technique. Accordingly, such components that are not essential being provided in the accompanying drawings and the detailed description may not readily mean that those components are essential.

Further, as the above embodiments are for illustration of the technique according to the present disclosure, various modifications, replacements, additions, and omissions can be made within the scope of the claims and equivalent thereof.

INDUSTRIAL APPLICABILITY

The present disclosure is applicable to devices capable of taking images in a plurality of viewpoints. Specifically, the present disclosure can be applied to such as imaging apparatus capable of taking images in a plurality of viewpoints, such as a digital still camera, a mobile device with a camera, and a smartphone.

What is claimed is:

1. An arithmetic processing device comprising:
a processor that:
(i) acquires a first viewpoint signal and a second viewpoint signal relating to images composed of a plurality of pixels;
(ii) divides a first image represented by the acquired first viewpoint signal into a plurality of blocks each including a predetermined number of pixels;
(iii) sets a first predetermined number of first blocks at first intervals in a second image represented by the second viewpoint signal, calculates a first evaluated value indicating a degree of matching by matching a matching target block in the first image with each of the first blocks, selects one of the first blocks from the first predetermined number of the first blocks based on the first evaluated value, and calculates a first parallax between the selected first block and the matching target block;
(iv) sets a second predetermined number of second blocks at second intervals in a second image represented by the second viewpoint signal, calculates a second evaluated value indicating a degree of matching by matching the matching target block with each of the second blocks, selects one of the second blocks from the second predetermined number of the second blocks based on the second evaluated value, and calculates a second parallax between the selected second block and the matching target block; and
(v) determines, based on the first evaluated value and the second evaluated value and based on the first parallax and the second parallax, whether or not to employ one of the first parallax and the second parallax as a parallax between the matching target block and a block in the second image corresponding to the matching target block,
wherein the processor:
(i) multiplies each of the first evaluated values obtained by the calculation by a first weighting value which is different for each first evaluation value, and selects one of the first blocks as a matching candidate based on a result of the multiplication,
(ii) multiplies each of the second evaluated values obtained by the calculation by a second weighting value which is different for each second evaluated value, and selects one of the second blocks as the matching candidate based on a result of the multiplication,
wherein the first weighting values of the first blocks take a greater value as a position of the first block corresponding to the first weighting value is closer to a central position of a first range being defined by the first predetermined number and the first interval, and
the second weighting values of the second blocks take a smaller value as a position of the second block corresponding to the second weighting value is closer to a central position of a second range being defined by the second predetermined number and the second interval.

2. The arithmetic processing device according to claim 1, wherein the processor:
(i) employs neither of the first parallax and the second parallax as the parallax between the matching target block and the block in the second image corresponding to the matching target block when both of the first evaluated value and the second evaluated value are smaller than a reference value,
(ii) employs the first parallax as the parallax between the matching target block and the block in the second image corresponding to the matching target block when the first evaluated value is greater than or equal to the reference value and the second evaluated value is smaller than the reference value,
(iii) employs the second parallax as the parallax between the matching target block and the block in the second image corresponding to the matching target block when the first evaluated value is smaller than the reference value and the second evaluated value is greater than or equal to the reference value, and
(iv) determines whether or not to employ one of the first parallax and the second parallax as the parallax between the matching target block and the block in the second image corresponding to the matching target block, based on magnitudes of the first parallax and the second parallax when both of the first evaluated value and the second evaluated value are greater than or equal to the reference value.

3. The arithmetic processing device according to claim 2, wherein the processor, in a case in which both of the first evaluated value and the second evaluated value are greater than or equal to the reference value:
(i) employs one of the first parallax and the second parallax as the parallax between the matching target block and the block in the second image corresponding to the matching target block when the magnitudes of the first parallax and the second parallax are equal, the processor, and
(ii) employs neither of the first parallax and the second parallax as the parallax between the matching target block and the block in the second image corresponding to the matching target block when the magnitudes of the first parallax and the second parallax are different.

4. The arithmetic processing device according to claim 1, wherein
a first range containing the first blocks of the first predetermined number is different from a second range containing the second blocks of the second predetermined number, the first range being defined by the first predetermined number and the first interval, the second range being defined by the second predetermined number and the second interval.

5. The arithmetic processing device according to claim 1, wherein
the first predetermined number is equal to the second predetermined number, and
the second interval is greater than the first interval.

* * * * *